United States Patent
Bower, III et al.

(10) Patent No.: US 12,271,478 B2
(45) Date of Patent: Apr. 8, 2025

(54) SIGNED UPDATE PACKAGE INCLUDING A SOFTWARE UPDATE PAYLOAD AND COMPATIBILITY DATA

(71) Applicant: Lenovo Global Technology (United States) Inc., Morrisville, NC (US)

(72) Inventors: Fred Allison Bower, III, Durham, NC (US); Caihong Zhang, Shanghai (CN); Ming Lei, Shanghai (CN)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 358 days.

(21) Appl. No.: 17/706,185

(22) Filed: Mar. 28, 2022

(65) Prior Publication Data

US 2023/0306117 A1 Sep. 28, 2023

(51) Int. Cl.
  *G06F 21/57* (2013.01)
  *G06F 21/55* (2013.01)
  *G06F 21/56* (2013.01)
  *G06F 21/64* (2013.01)

(52) U.S. Cl.
  CPC .......... *G06F 21/572* (2013.01); *G06F 21/554* (2013.01); *G06F 21/565* (2013.01); *G06F 21/64* (2013.01)

(58) Field of Classification Search
  USPC .................................................. 726/22
  See application file for complete search history.

(56) References Cited

U.S. PATENT DOCUMENTS

| | | | | |
|---|---|---|---|---|
| 8,555,273 B1* | 10/2013 | Chia | .............. | G06F 8/654 717/172 |
| 10,609,063 B1* | 3/2020 | Oliphant | .............. | G06F 21/50 |
| 11,870,910 B2* | 1/2024 | Spanier | .............. | H04L 9/3247 |
| 2004/0215755 A1* | 10/2004 | O'Neill | .............. | G06F 8/658 717/170 |

(Continued)

FOREIGN PATENT DOCUMENTS

| | | | | |
|---|---|---|---|---|
| EP | 1918841 A2 * | 5/2008 | ......... | G06F 21/572 |
| RU | 2408063 C2 * | 12/2010 | ......... | G06F 8/65 |
| WO | WO-2020223588 A1 * | 11/2020 | ......... | G06F 21/44 |

*Primary Examiner* — Sakinah White Taylor
(74) *Attorney, Agent, or Firm* — Jeffrey L. Streets

(57) ABSTRACT

A computer program product and computer-implemented method include operations including identifying a software update payload that is available for distribution and identifying compatibility data for the software update payload, wherein the compatibility data identifies configurations of a computing device that are compatible with the software update payload. The operations further include forming an update package that includes the software update payload and the compatibility data, digitally signing the update package, and providing the signed update package to one or more computing devices over a network. A computing device receiving the signed update package may authenticate the signed update package, verify the package has not experienced an unauthorized modification, access the compatibility data, determine whether the compatibility data indicates that the software update payload is compatible with the configuration of the computing device, and use the software update payload to update the computing device in response to a determination of compatibility.

18 Claims, 5 Drawing Sheets

(56) References Cited

U.S. PATENT DOCUMENTS

| | | | |
|---|---|---|---|
| 2015/0178064 A1* | 6/2015 | Cairns | G06F 8/65 |
| | | | 717/171 |
| 2017/0039372 A1* | 2/2017 | Koval | H04L 67/06 |
| 2018/0176326 A1* | 6/2018 | Shantharam | H04L 69/329 |
| 2019/0253262 A1* | 8/2019 | Smith | H04W 12/08 |
| 2020/0257518 A1* | 8/2020 | Liedtke | G06F 8/65 |

* cited by examiner

US 12,271,478 B2

SIGNED UPDATE PACKAGE INCLUDING A SOFTWARE UPDATE PAYLOAD AND COMPATIBILITY DATA

BACKGROUND

The present disclosure relates to methods of implementing software updates on a computer.

BACKGROUND OF THE RELATED ART

Many platform software suites have a certification process whereby the hardware, firmware, and base platform software elements are tested and certified as compatible and supported in a given configuration or combination. It is commonly the case that a computing system will drift out of compliance over time due to asynchronous release of software elements, failure to certify compatibility of the released software elements for a given platform software suite, or due to the application of test or debug code when a problem is being diagnosed.

One solution to this problem involves automatically checking a compatibility matrix at the time of performing an update. Typical solutions will have an update tool that checks a central database for the current list of compatible elements and configurations and then warn or disallow changes that do not meet the supported configuration criteria. However, in practice, access to the central database cannot be guaranteed at any particular time. If the central database is not accessible, the system administrator may resort to guessing or assuming whether a given update is compatible and should be applied.

BRIEF SUMMARY

Some embodiments provide a computer program product including a non-volatile computer readable medium and non-transitory program instructions embodied therein, wherein the program instructions are configured to be executable by a processor to cause the processor to perform various operations. The operations include identifying a software update payload that is available for distribution and identifying compatibility data for the software update payload, wherein the compatibility data identifies one or more configurations of a computing device that) are compatible with the software update payload. The operations further include forming an update package that includes the software update payload and the compatibility data, digitally signing the update package, and providing the signed update package to one or more computing devices over a network.

Some embodiments provide a computer-implemented method that includes various operations. The operations include identifying a software update payload that is available for distribution and identifying compatibility data for the software update payload, wherein the compatibility data identifies one or more configurations of a computing device that are compatible with the software update payload. The operations further include forming an update package that includes the software update payload and the compatibility data, digitally signing the update package, and providing the signed update package to one or more computing devices over a network.

Some embodiments provide a computer program product including a non-volatile computer readable medium and non-transitory program instructions embodied therein, wherein the program instructions are configured to be executable by a processor to cause the processor to perform various operations. The operations include receiving a signed update package over a network, wherein the update package is signed by a software update provider and includes a software update payload and compatibility data for the software update payload. The operations further include authenticating the signed update package, verifying that the update package has not experienced an unauthorized modification, and accessing the compatibility data, wherein the compatibility data identifies one or more configurations that are compatible with the software update payload. Still further, the operations include determining whether the compatibility data indicates that the software update payload is compatible with the configuration of a computing device that includes the processor and using the software update payload to update the computing device in response to determining that the software update payload is compatible with the configuration of the computing device.

DETAILED DESCRIPTION

Figure 1:
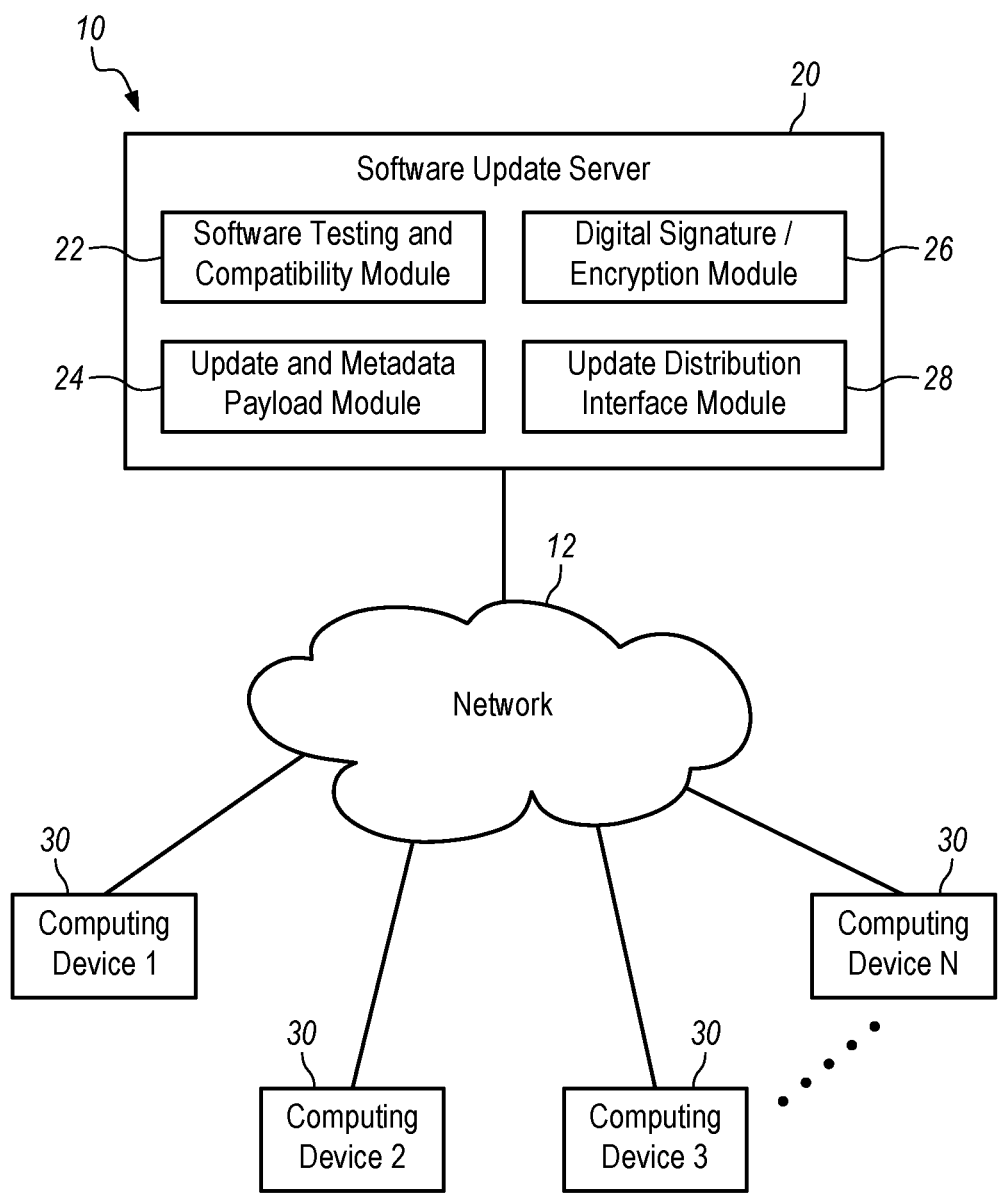
FIG. 1 is a diagram of a system including a software update server and multiple computing devices.

Some embodiments provide a computer program product including a non-volatile computer readable medium and non-transitory program instructions embodied therein, wherein the program instructions are configured to be executable by a processor to cause the processor to perform various operations. The operations include identifying a software update payload that is available for distribution and identifying compatibility data for the software update payload, wherein the compatibility data identifies one or more configurations of a computing device that are compatible with the software update payload. The operations further include forming an update package that includes the software update payload and the compatibility data, digitally signing the update package, and providing the signed update package to one or more computing devices over a network.

In some embodiments, the foregoing operations may be performed by a software update server or other source of one or more software update. Accordingly, the operations form the signed update packages and make them available to the one or more computing devices over a network, such as the Internet. The software update server may be managed by a software vendor to make the signed update packages available for download to computing devices operated by customers or licensees of the software vendor. The software vendor may perform testing of the software update payload to determine the compatibility of the software update payload with various configurations of a computing device. For example, the software vendor may test compatibility of the software update payload with various hardware configurations, firmware configurations and/or software configurations. Compatibility data and/or incompatibility data are recorded and compiled into compatibility data, which may take the form of a compatibility table or other data structure identifying known configurations that are compatible and/or incompatible with the software update payload. In accordance with various embodiments, the compatibility data accompanies the) software update payload being distributed or otherwise made available to the computing devices. In one option, the compatibility data is formatted as metadata to the software update payload. The metadata may further include information about the software vendor, version or update serial numbers, release date and the like.

A software update payload is a set of changes to software, such as a computer program, program instructions and/or supporting data, that has been developed to update, fix or improve the software. For example, the software update payload may include code to fix a security vulnerability, fix a bug, improve or expand the functionality or usability, and/or increase the performance of the software. Compatibility of the software update payload identifies whether the updated software will run properly on a computing device having a particular configuration.

A computing device may have a known hardware configuration, firmware configuration and/or software configuration. The hardware configuration may include a description of one or more of the hardware components included in the computing device. Non-limiting examples of a hardware configuration that may affect compatibility with a software update payload may include the type of central processing unit, the amount and type of volatile memory, the amount and type of cache, and the availability of a graphics processing unit, and the like. The firmware configuration of certain firmware, such as a Basic Input/Output System (BIOS), may be identified by a firmware version number. A software update payload may require a firmware version that is within a certain range of firmware update numbers. Furthermore, the configuration of the software itself may or may not be compatible with a particular software update payload.

The update package includes the software update payload and the compatibility data for the software update payload. Including the compatibility data in the same update package with the software update payload enables the computing device to determine whether the software update payload is compatible with the configuration of the computing device without an active online connection during the compatibility determination. All the available and necessary compatibility data is provided along with the software update payload such that the compatibility data will be available to support a decision whether or not to install the software update payload without having to go locate external compatibility data. In one option, the compatibility data that is included in the signed update package may be solely directed to the compatibility of the particular software update payload within the signed update package.

The update package is digitally signed to enable any computing device that receives the signed update package to authenticate the signed update package and verify that the update package has not experienced an unauthorized modification. Authentication of the signed update package is proof that the signed update package came from the entity that digitally signed the update package. For example, if a software vendor digitally signs the update package, then the computing device that receives the signed update package will be able to determine that the signed update package did in fact come from the software vendor.

In some embodiments, the update package may include multiple software update payloads (i.e., software updates for multiple software applications) and compatibility data for each software update payload. Furthermore, each individual software update payload in the update package may be digitally signed by the creator, source or bundler of the individual software update payload. Alternatively, the update package may be digitally signed by one or more of the creators, sources or bundlers of the individual software update payloads. Still further, an update package may be digitally signed by a first creator, source or bundler, while one or more software update payloads within the update package may be digitally signed by a second creator, source of bundler. In this latter option, the update package may be considered to have nested structure of a digitally signed update package contained within another digitally signed update package. For example, multiple software vendors may each provide a digitally signed update package, using their own digital signature, for a software update they created for a particular software application that they created, yet a systems integrator or solutions provider may combine the three digitally signed update packages into one combined update package signed with the digital signature of the system integrator. Accordingly, the update package and each software update within the update package may be authenticated and verified against unauthorized modification. Similarly, if a first entity is responsible for generating the software update and a second entity is responsible for generating the compatibility data for the software update generated by the first entity, then the first entity may use their digital signature to digitally sign the software update and the second entity may use their digital signature to digitally sign the compatibility data. Optionally, a systems integrator or solutions provider may use their own digital signature to digitally sign the update package containing both the digitally signed software update (signed by the first entity) and the digitally signed compatibility data (signed by the second entity). It should be recognized that, in accordance with the disclosed embodiments, other and further combinations of digitally signed software update packages and components of the update packages may be implemented.

Some embodiments provide a computer-implemented method that includes various operations. The operations include identifying a software update payload that is available for distribution and identifying compatibility data for the software update payload, wherein the compatibility data identifies one or more configurations of a computing device that are compatible with the software update payload. The operations further include forming an update package that includes the software update payload and the compatibility data, digitally signing the update package, and providing the signed update package to one or more computing devices over a network. Optionally, the computer-implemented method may include any one or more operations or conditions described in reference to the above computer program product.

Some embodiments provide a computer program product including a non-volatile computer readable medium and non-transitory program instructions embodied therein, wherein the program instructions are configured to be executable by a processor to cause the processor to perform various operations. The operations include receiving a signed update package over a network, wherein the update package is signed by a software update provider and includes a software update payload and compatibility data for the software update payload. The operations further include authenticating the signed update package, verifying that the update package has not experienced an unauthorized modification, and accessing the compatibility data, wherein the compatibility data identifies one or more configurations that are compatible with the software update payload. Still further, the operations include determining whether the compatibility data indicates that the software update payload is compatible with the configuration of a computing device that includes the processor and using the software update payload to update the computing device in response to determining that the software update payload is compatible with the configuration of the computing device.

In some embodiments, the foregoing operations may be performed by a computing device that receives the signed update package from the software update server or other source of one or more software updates. In one option, the one or more configurations identified in the compatibility data may be hardware configurations, firmware configurations and/or software configurations. Independently, the compatibility data may be formatted as metadata to the software update payload.

The update package includes the software update payload and the compatibility data for the software update payload. Including the compatibility data in the same update package with the software update payload enables the computing device to determine whether the software update payload is compatible with the configuration of the computing device without an active online connection during the compatibility determination. All the available and necessary compatibility data is provided to the computing device along with the software update payload such that the compatibility data will be available to support a decision whether or not to install the software update payload without having to go locate external compatibility data. In one option, the compatibility data that is included in the signed update package may be solely directed to the compatibility of the particular software update payload within the signed update package.

Some embodiments provide the technical benefit of enabling a computing device to access compatibility data for any update package that it has received without requiring a network connection to a software update server. Some embodiments may provide the further technical benefits of authenticating the software update payload and validating that the software update payload has not experienced an unauthorized modification. Similarly, some embodiments may provide the technical benefit of authenticating the compatibility data and validating that the compatibility data has not experienced an unauthorized modification.

A digital signature is a mathematical scheme for verifying the authenticity of digital messages or documents. A valid digital signature gives a recipient very strong reason to believe that the message was created by a known sender (authentication), and that the message was not altered in transit (integrity). Digital signatures may employ asymmetric cryptography. Digitally signed messages may be anything representable as a bitstring: examples include electronic mail, contracts, or a message sent via some other cryptographic protocol. A digital signature scheme typically may consist of three algorithms. A key generation algorithm may select a private key uniformly at random from a set of possible private keys and then outputs the private key and a corresponding public key. A signing algorithm may produce a signature using a given message and a private key. A signature verifying algorithm may accept or reject the message's claim to authenticity based on the given message, the public key and the signature. Two main properties are required. First, the authenticity of a signature generated from a fixed message and fixed private key can be verified by using the corresponding public key. Secondly, it should be computationally infeasible to generate a valid signature for a party without knowing that party's private key. A digital signature is an authentication mechanism that enables the creator of the message to attach a code that acts as a signature. The Digital Signature Algorithm (DSA) is one example of a signing algorithm. Another digital signature scheme is based on RSA (Rivest-Shamir-Adleman), which is a public-key cryptosystem that is widely used for secure data transmission.

FIG. 1 is a diagram of a system 10 including a software update server 20 and multiple computing devices 30 in communication over a network 12. The software update server 20 may include a software testing and compatibility module 22, an update and metadata payload module 24, a digital signature and encryption module 26, and an update distribution interface module 28. The software testing and compatibility module 22 may be used to test a software update payload and determine compatibility of the software update payload with various configurations of a computing device. The update and metadata payload module 24 may be used to organize the software update payload and the compatibility data into an update package, then the digital signature and encryption module 26 may be used to digitally sign the update package and may be further used to encrypt the software update payload and/or the compatibility metadata. The update distribution interface module 28 may be used to make the signed update package available to one or more computing devices.

Figure 2:
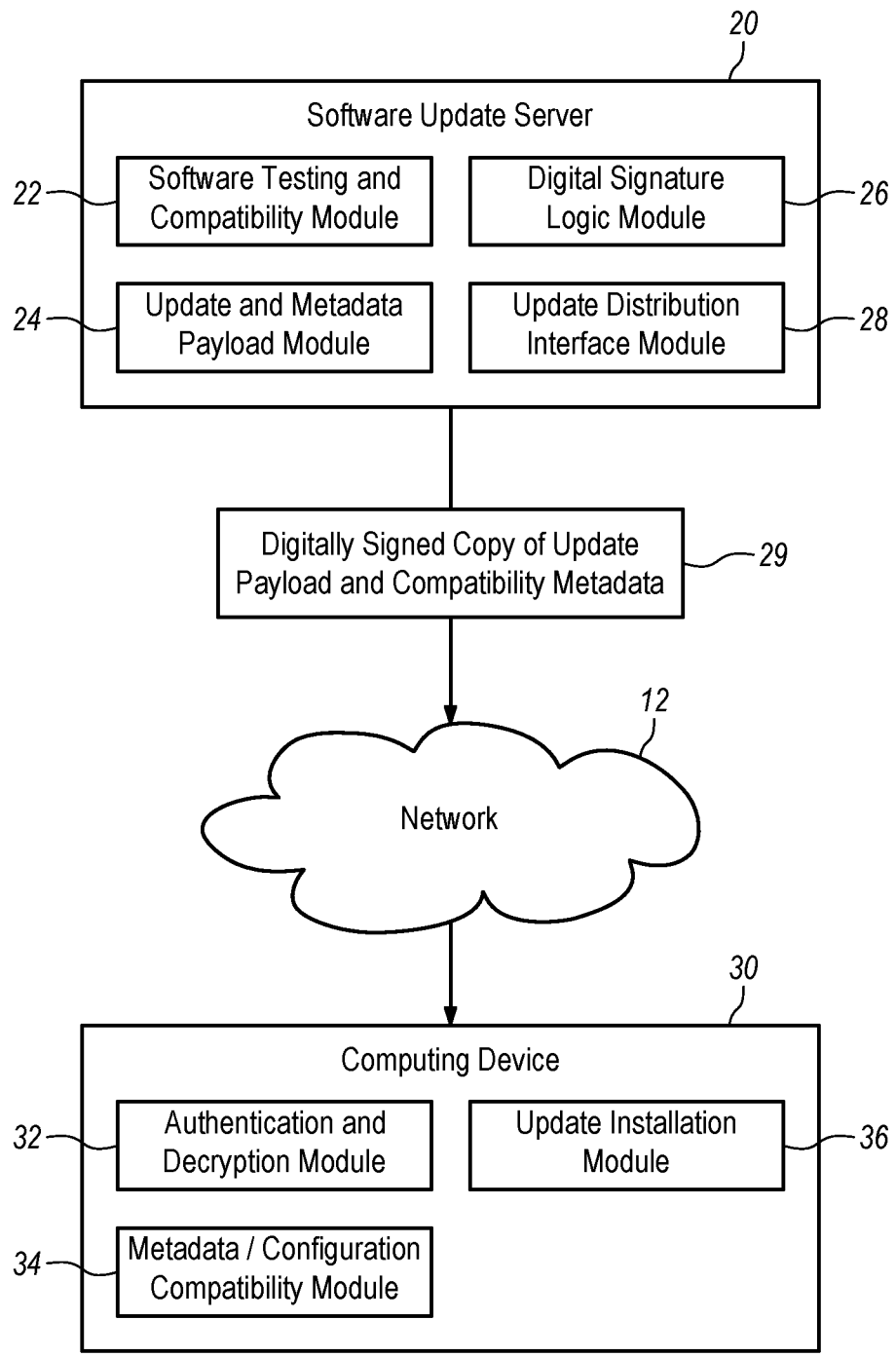
FIG. 2 is a diagram of the software update server communicating a digitally signed copy of an update payload and the associated compatibility metadata to a computing device.

FIG. 2 is a diagram of the software update server 20 communicating a digitally signed copy of an update payload and the associated compatibility metadata ("a signed update package") 29 to a computing device 30 (representative of any of the computing devices 30 of FIG. 1) over the network 12. The computing device 30 may include an authentication and decryption module 32, a metadata and configuration compatibility module 34, and an update installation module 36.

The authentication and decryption module 32 may be used to authenticate that the signed update package came from the software vendor or other specific party, and also to decrypt the software update payload and/or compatibility metadata if it is encrypted. The metadata and configuration compatibility module 34 may be used to compare the actual configuration of the computing device with the compatibility metadata and determine whether the update payload is compatible with the computing device. If the update payload is determined to be compatible with the computing device, then the update installation module 36 may install the update payload on the computing device.

Figure 3:
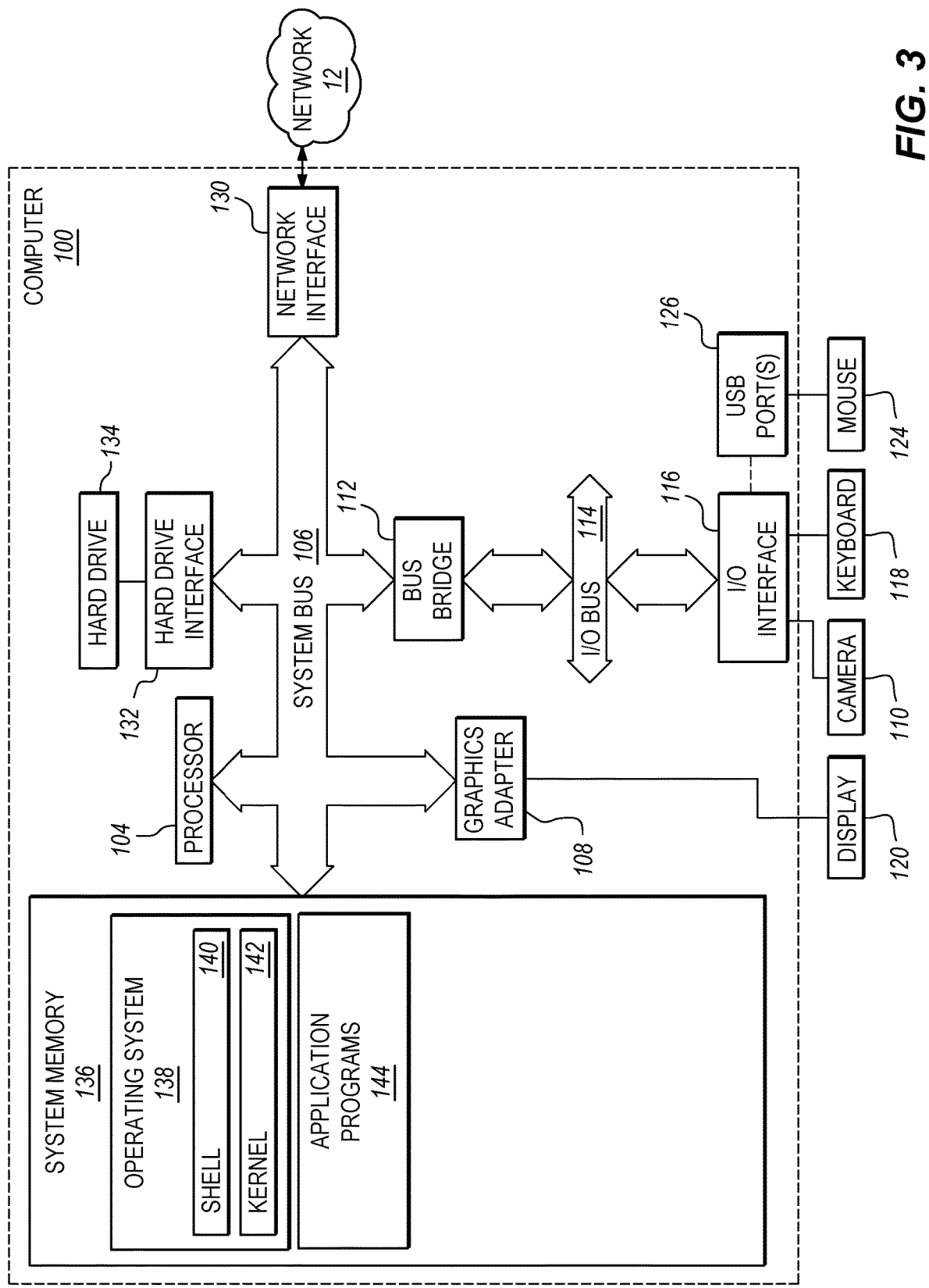
FIG. 3 is a diagram of a computer that may be representative of the software update server and/or the computing devices.

FIG. 3 is a diagram of one embodiment of a computer 100 that may be included in the system 10 of FIG. 1. For example, the computer 100 may be, without limitation, representative of the architecture of the software update server 20 and/or the computing devices 30. The computer 100 includes a processor unit 104 that is coupled to a system bus 106. The processor unit 104 may utilize one or more processors, each of which has one or more processor cores. An optional graphics adapter 108, which may drive/support an optional display 120, is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a camera 110, a keyboard 118 (such as a touch screen virtual keyboard), and a USB mouse 124 via USB port(s) 126 (or other type of pointing device, such as a trackpad). As depicted, the computer 100 can communicate with other network devices over the network 12 using a network adapter or network interface controller 130.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include an operating system (OS) 138 and application programs 144. The hardware elements depicted in the computer 100 are not intended to be exhaustive, but rather are representative.

The operating system 138 includes a shell 140 for providing transparent user access to resources such as application programs 144. Generally, the shell 140 is a program that provides an interpreter and an interface between the user and the operating system. More specifically, the shell 140 may execute commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, the present invention may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management. In addition, the computer 100 may include application programs 144 stored in the system memory 136. For example, where the computer 100 is a software update server 20, the application programs 144 may include the software testing and compatibility module 22, the update and metadata payload module 24, the digital signature and encryption module 26, and the update distribution interface module 28. Where the computer 100 is one of the computing devices 30, the application programs 114 may include the authentication and decryption module 32, the metadata and configuration compatibility module 34, and the update installation module 36.

Figure 4:
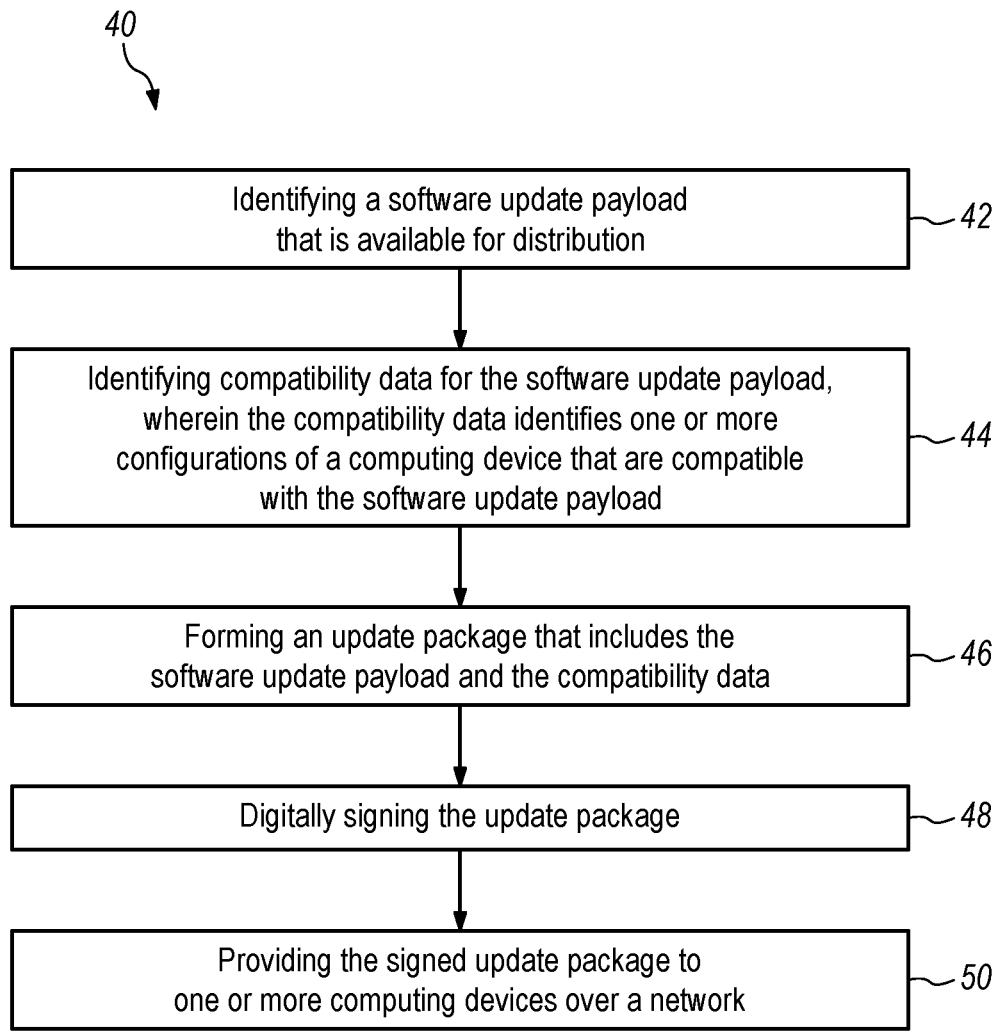
FIG. 4 is a flowchart of a method performed by the software update server.

FIG. 4 is a flowchart of a method 40 including operations performed by the software update server 20 (see FIG. 1). Operation 42 includes identifying a software update payload that is available for distribution. Operation 44 includes identifying compatibility data for the software update payload, wherein the compatibility data identifies one or more configurations of a computing device that are compatible with the software update payload. Operation 46 includes forming an update package that includes the software update payload and the compatibility data. Operation 48 includes digitally signing the update package. Operation 50 includes providing the signed update package to one or more computing devices over a network.

Figure 5:
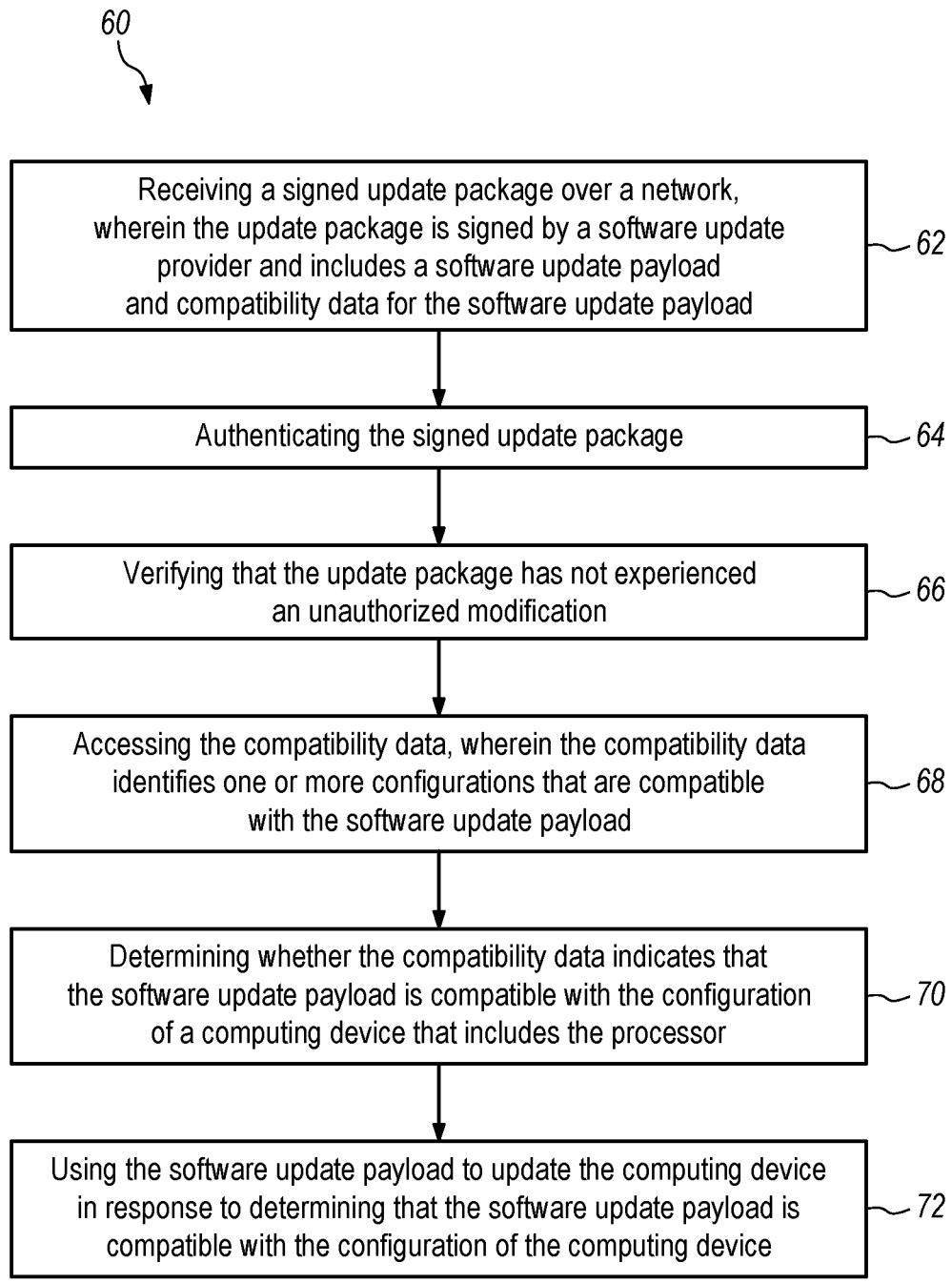
FIG. 5 is a flowchart of a method performed by one of the computing devices.

FIG. 5 is a flowchart of a method 60 including operations performed by one of the computing devices 30 (see FIG. 1). Operation 62 includes receiving a signed update package over a network, wherein the update package is signed by a software update provider and includes a software update payload and compatibility data for the software update payload. Operation 64 includes authenticating the signed update package. Operation 66 includes verifying that the update package has not experienced an unauthorized modification. Operation 68 includes accessing the compatibility data, wherein the compatibility data identifies one or more configurations that are compatible with the software update payload. Operation 70 includes determining whether the compatibility data indicates that the software update payload is compatible with the configuration of a computing device that includes the processor. Operation 72 includes using the software update payload to update the computing device in response to determining that the software update payload is compatible with the configuration of the computing device.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and program instructions embodied therein, the program instructions being configured to be executable by a processor to cause the processor to perform operations comprising:
    identifying a software update payload that is available for distribution;
    identifying compatibility data for the software update payload, wherein the compatibility data identifies one or more configurations of a computing device that are compatible with the software update payload;
    forming an update package that includes the software update payload and the compatibility data;
    digitally signing the update package; and
    providing the signed update package to one or more computing devices over a network, wherein the compatibility data that is included in the signed update package is solely directed to the compatibility of the software update payload within the signed update package.

2. The computer program product of claim 1, wherein the one or more configurations are hardware configurations, firmware configurations and/or software configurations.

3. The computer program product of claim 1, wherein the compatibility data is formatted as metadata to the software update payload.

4. The computer program product of claim 1, wherein the digital signature enables a computing device receiving the signed update package to authenticate the signed update package and verify that the update package has not experienced an unauthorized modification.

5. The computer program product of claim 1, wherein the compatibility data received in the signed update package enables the computing device that receives the signed update package to determine whether the software update payload is compatible with the configuration of the computing device without an active online connection during the compatibility determination.

6. The computer program product of claim 1, further comprising:
    receiving the software update payload and the compatibility data for the software update payload over a network from a first entity, wherein the software update payload and the compatibility data for the software update payload are digitally signed with a first digital signature of the first entity, and wherein the operation of digitally signing the update package includes digitally signing the update package with a second digital signature of a second entity.

7. The computer program product of claim 6, further comprising:
receiving a second software update payload that is available for distribution;
receiving second compatibility data for the second software update payload, wherein the second compatibility data identifies one or more configurations of a computing device that are compatible with the second software update payload, wherein the second software update payload and second compatibility data are digitally signed with a third digital signature of a third entity; and
forming an update package that includes the software update payload and the compatibility data digitally signed by the first entity and the second software update payload and the second compatibility data digitally signed by the third entity.

8. The computer program product of claim 1, further comprising:
receiving the software update payload over a network from a first entity, wherein the software update payload is digitally signed with a first digital signature of the first entity;
receiving the compatibility data for the software update payload over a network from a third entity, wherein the compatibility data for the software update payload is digitally signed with a third digital signature of the third entity; and
wherein the operation of digitally signing the update package includes digitally signing the update package with a second digital signature of a second entity.

9. A computer-implemented method, comprising:
identifying a software update payload that is available for distribution;
identifying compatibility data for the software update payload, wherein the compatibility data identifies one or more configurations of a computing device that are compatible with the software update payload;
forming an update package that includes the software update payload and the compatibility data;
digitally signing the update package; and
providing the signed update package to one or more computing devices over a network, wherein the compatibility data that is included in the signed update package is solely directed to the compatibility of the software update payload within the signed update package.

10. A computer program product comprising a non-transitory computer readable medium and program instructions embodied therein, the program instructions being configured to be executable by a processor to cause the processor to perform operations comprising:
receiving a signed update package over a network from a first entity, wherein the update package is signed with a first digital signature of the first entity and includes a software update payload and compatibility data for the software update payload, wherein the compatibility data that is included in the signed update package is solely directed to the compatibility of the software update payload within the signed update package;
authenticating the signed update package;
verifying that the update package has not experienced an unauthorized modification;
accessing the compatibility data, wherein the compatibility data identifies one or more configurations of a computing device that are compatible with the software update payload;
determining whether the compatibility data indicates that the software update payload is compatible with the configuration of a computing device that includes the processor; and
using the software update payload to update the computing device in response to determining that the software update payload is compatible with the configuration of the computing device.

11. The computer program product of claim 10, wherein the one or more configurations are hardware configurations, firmware configurations and/or software configurations.

12. The computer program product of claim 10, wherein the compatibility data is formatted as metadata to the software update payload.

13. The computer program product of claim 10, wherein the compatibility of the software update payload with the configuration of the computing device is determined without an active online connection during the compatibility determination.

14. The computer program product of claim 10, wherein the software update payload and the compatibility data for the software update payload are digitally signed with a second digital signature of a second entity.

15. The computer program product of claim 14, wherein the signed update package further includes a second software update payload and second compatibility data for the second software update payload, wherein the second compatibility data identifies one or more configurations of a computing device that are compatible with the second software update payload, and wherein the second software update payload and second compatibility data are digitally signed with a third digital signature of a third entity.

16. The computer program product of claim 10, wherein the software update payload is digitally signed with a second digital signature of a second entity, and wherein the compatibility data for the software update payload is digitally signed with a third digital signature of a third entity.

17. The computer program product of claim 16, further comprising:
authenticating the signed software update payload; and
verifying that the signed software update payload has not experienced an unauthorized modification.

18. The computer program product of claim 17, further comprising:
authenticating the signed compatibility data for the software update payload; and
verifying that the signed compatibility data for the software update payload has not experienced an unauthorized modification.

* * * * *